(12) United States Patent
Lea et al.

(10) Patent No.: US 8,080,279 B2
(45) Date of Patent: Dec. 20, 2011

(54) METHOD FOR DOUBLE-DIP SUBSTRATE SPIN OPTIMIZATION OF COATED MICRO ARRAY SUPPORTS

(75) Inventors: Peter Lea, Toronto (CA); Mingfu Ling, Toronto (CA); Jennifer Hansen, Bolton (CA)

(73) Assignee: SQI Diagnostics Systems Inc., Toronto, Ontario (CA)

( * ) Notice: Subject to any disclaimer, the term of this patent is extended or adjusted under 35 U.S.C. 154(b) by 1049 days.

(21) Appl. No.: 11/999,276

(22) Filed: Dec. 4, 2007

(65) Prior Publication Data

US 2008/0131600 A1 Jun. 5, 2008

(30) Foreign Application Priority Data

Dec. 4, 2006 (CA) ..................................... 2569971

(51) Int. Cl.
*B05D 3/12* (2006.01)
(52) U.S. Cl. .................... 427/240; 427/346; 427/421.1; 427/430.1; 118/52; 118/56; 118/300; 118/400
(58) Field of Classification Search .................. 427/240, 427/346, 430.1, 421.1; 118/52, 56, 300, 118/400
See application file for complete search history.

(56) References Cited

U.S. PATENT DOCUMENTS

| | | | |
|---|---|---|---|
| 3,730,760 | A | 5/1973 | Machmiller |
| 4,746,668 | A | 5/1988 | Sato et al. |
| 4,784,157 | A | 11/1988 | Halls et al. |
| 4,810,658 | A | 3/1989 | Shanks et al. |
| 4,978,503 | A | 12/1990 | Shanks et al. |
| 5,141,868 | A | 8/1992 | Shanks et al. |
| 5,200,312 | A | 4/1993 | Oprandy |
| 5,781,289 | A | 7/1998 | Sabsabi et al. |
| 6,066,448 | A | 5/2000 | Wohlstadter et al. |
| 6,090,545 | A | 7/2000 | Wohlstadter et al. |
| 6,123,687 | A | 9/2000 | Simonyi et al. |
| 6,140,045 | A | 10/2000 | Wohlstadter et al. |
| 6,141,096 | A | 10/2000 | Stern et al. |
| 6,154,282 | A | 11/2000 | Lilge et al. |
| 6,187,530 | B1 | 2/2001 | Scholin et al. |
| 6,207,369 | B1 | 3/2001 | Wohlstadter et al. |
| 6,265,176 | B1 | 7/2001 | Lin et al. |
| 6,309,893 | B1 | 10/2001 | Deeley et al. |
| 6,410,334 | B1 | 6/2002 | Schmolz |
| 6,673,533 | B1 | 1/2004 | Wohlstadter et al. |
| 6,766,817 | B2 | 7/2004 | da Silva |
| 6,918,404 | B2 | 7/2005 | Dias da Silva |
| 7,066,586 | B2 | 6/2006 | da Silva |
| 7,285,255 | B2 | 10/2007 | Kadlec et al. |
| 2001/0007862 | A1 | 7/2001 | Kim |
| 2001/0021534 | A1 | 9/2001 | Wohlstadter et al. |
| 2003/0077390 | A1* | 4/2003 | Potyrailo et al. ........... 427/372.2 |
| 2004/0012780 | A1 | 1/2004 | Sharma |
| 2004/0086423 | A1 | 5/2004 | Wohlstadter et al. |
| 2004/0191891 | A1 | 9/2004 | Tsinberg et al. |
| 2004/0232570 | A1* | 11/2004 | Hayashi et al. ................ 264/1.1 |
| 2005/0130120 | A1 | 6/2005 | Lambotte et al. |
| 2006/0073535 | A1 | 4/2006 | Saito et al. |
| 2008/0032281 | A1 | 2/2008 | Lea et al. |
| 2008/0220980 | A1 | 9/2008 | Lea et al. |
| 2008/0259321 | A1 | 10/2008 | Lea et al. |
| 2008/0269075 | A1 | 10/2008 | Lea et al. |
| 2009/0074878 | A1 | 3/2009 | Lea et al. |
| 2011/0065134 | A1 | 3/2011 | Lea et al. |

FOREIGN PATENT DOCUMENTS

| | | |
|---|---|---|
| JP | 3231970 | 10/1991 |
| JP | 2942213 | 3/1998 |
| WO | WO 86/00135 | 1/1986 |
| WO | WO 86/00138 | 1/1986 |
| WO | WO 86/00141 | 1/1986 |
| WO | WO 96/09549 | 3/1996 |
| WO | WO 96/28538 | 9/1996 |
| WO | WO 98/12539 | 3/1998 |
| WO | WO 03/025573 A1 | 3/2003 |
| WO | WO 03/034026 A2 | 4/2003 |
| WO | WO 2005/031355 A1 | 4/2005 |
| WO | WO 2010/075632 A1 | 7/2010 |

OTHER PUBLICATIONS

PCT International Search Report, PCT/CA2005/000827, dated Oct. 3, 2005.
PCT International Preliminary Report on Patentability, PCT/CA2005/000827, dated Dec. 4, 2006.
PCT Preliminary Report on Patentability, PCT/CA2005/001129; dated Jan. 16, 2007.
International Preliminary Report on Patentability, International Application No. PCT/CA2005/001147, dated Feb. 1, 2007.
Supplementary European Search Report from Application EP05772105.2, mailed on Aug. 6, 2007.
Huang, Ruo-Pan, Simultaneous Detection of Multiple Proteins with an Array-Based Enzyme-Linked Immunosorbent Assay (ELISA) and Enhanced Chemiluminescense (ECL), Clinical Chemistry and Laboratory Medicine, Mar. 2001, pp. 209-214, vol. 39, No. 3.
Joos et al., A microarray enzyme-linked immunosorbent assay for autoimmune diagnostics, Electrophoresis, 2000, pp. 2641-2650, vol. 21.
Stoll et al., Protein Microarray Technology, Frontiers in Bioscience, Jan. 1, 2002, pp. 13-32.
Templin et al., Protein Microarrays and Multiplexed Sandwich Immunoassays: What Beats the Beads?, Combinatorial Chemistry and High Throughput Screening, May 2004, pp. 223-229, vol. 7, No. 3.
U.S. Appl. No. 12/998,991, filed Jun. 17, 2001, Peter Lea, Methods for Multiplex Analyte Detection and Quantification.

* cited by examiner

*Primary Examiner* — Kirsten Jolley
(74) *Attorney, Agent, or Firm* — TraskBritt

(57) ABSTRACT

The present invention discloses a method for preparing a substrate coated support for use in micro-array devices. The method of the present invention comprises the steps of applying a first coat of substrate to a support, making the substrate coating ramp by subjecting the coated support to centripetal forces, adding a second coat of substrate to the resulting support having a ramping planar coat and subjecting the coated support to centripetal forces for a second time to produce a substrate coated membrane in which the thickness of the substrate layer is uniform across the entire coated surface.

17 Claims, 2 Drawing Sheets

METHOD FOR DOUBLE-DIP SUBSTRATE SPIN OPTIMIZATION OF COATED MICRO ARRAY SUPPORTS

CROSS-REFERENCE TO RELATED APPLICATION

This application claims priority under 35 U.S.C. §119 to Canadian Patent Application No. 2,569,971, filed Dec. 4, 2006.

BACKGROUND OF THE INVENTION

1. Field of the Invention

The present invention relates to the field of micro-array assay technology. More particularly, the present invention relates to methods for the preparation of substrate coated micro-array supports. Even more particularly, the present invention relates to the use of centripetal force to prepare coated micro-array support surfaces evenly coated with substrate.

Micro-array platforms are devices that comprise support material that is coated with a substrate to localize an assay reaction. A variety of support and coating materials have been used and are selected based on the nature of the assay for which the micro-array will be used. In the case of micro-arrays in which the substrate material is coated onto the surface of a support material, the substrate may be applied by dipping the support material into liquid or semi-solid substrate or dripping the substrate onto the surface of the support. Spin coating is one method for spreading the substrate across the surface of a support that consists of applying centripetal acceleration to the support material after a substrate has been applied.

2. State of the Art

Prior art spin coating techniques whereby a single side of a support is coated with a substrate require a multiplicity of handling steps in the mounting of the support, the coating of the substrate, the semi-curing or drying of the surface, removal of excess substrate and remounting and repeating of the coating cycle. Importantly, there are practical limits to the evenness of a coating and thinness of the coating obtainable by spin coating methods. U.S. Pat. No. 3,730,760 describes a method in which centrifugal forces are applied to coated substrate supports. This method creates a ramp effect, whereby the inner diameter edges of the coated substrate are thinner in thickness than the outer diameter edges of the coated substrate. Control of this ramp effect is difficult but desirable as it affects the relative unit volume density distribution of suspended particulates in the coating substrate film.

A film formation method involving spin coating comprises adding a coating substrate solution drop-wise to a support to be coated and drawing the coating solution thereon by centrifugal force, so as to form a thin film on the support. This method causes film thickness distribution to occur. Japanese Patent 2,942,213, discloses a modification to this method wherein the drop wise coating solution is added to a sealed cup. Japanese Patent 3,231,970 discloses a modification to the sealed cup method in which gas is injected into the cup.

U.S. patent application 2006073521 discloses a spin coating method wherein the support is rotated in a state where the surface of the support to be coated is inclined during coating. The objective of this method is to produce a substrate film on the surface of the support with a film thickness that is even across the surface of the support. Each of these prior art references describe methods in which a single coating step is used in the preparation of a support having a film or coating of substrate evenly distributed across its surface. However, none of these methods adequately prevent unevenness and ramp effects in the film thickness generated in the substrate and manifested at marginal parts of the support.

SUMMARY OF THE INVENTION

The present invention includes a method comprising the following steps:

(a) Preparing a substrate coated support in which the coating or film is sufficiently uniform in thickness to enable the use of the coated support in a micro-array platform;

(b) Allowing controlled modification of thin and ultra-thin coatings on a support while effectively utilizing uniform spatial resolution of suspensions contained within the substrate; and (c) Simultaneously modifying the substrate coating on planar supports with substrate coated onto both planar support surfaces.

According to one aspect of the invention there is provided a method for preparing a substrate coated support for use in a micro-array comprising the steps of:

(a) providing a support having a first edge and a second edge (b) coating at least one surface of said support with a substrate;

(c) providing a dust free chamber having an inner diameter and an outer diameter;

(d) positioning said support into the dust free chamber such that the first edge of the support is in proximity to the inner diameter of the dust free chamber and the outer edge of the support is in proximity to the outer diameter of the chamber;

(e) centrifuging the chamber at a relative centrifugal force and for a length of time until the substrate coating on the substrate coated support is thinner at the first edge than the second edge wherein the inner diameter is closer to an axis of rotation about the chamber than the outer diameter;

(f) removing the support from the dust free chamber;

(g) applying a second coat of substrate to the support according to steps (d) to (f) thereby proving a double coated support having a planar film with uniform thickness across the at least one surface of the support.

The method of the present invention preferably includes the steps of first applying a single coat of a substrate onto a support having planar surfaces by dipping, under controlled conditions, the support in a vertical position and with its planar surfaces exposed, into the substrate. The substrate coated support is then placed into a dust free chamber and subjected to a first spin by a centrifugal rotating means for rotating the chamber and substrate support. The chamber is rotated about its own axis in a vertical or horizontal position. The chamber is spun at sufficient speed such that the centripetal acceleration force (relative g force) applied to the support causes the substrate coating layer to form a ramped coating layer with time-dependant increasing thickness in the direction from the inner to the outer diameter of the centrifuge during rotation of the substrate. Initial spin speeds generating centripetal acceleration equivalent to 150 g may be used for glass supports. The upper spin speed is limited by the ability of the support to withstand the requisite, applied centripetal forces. The time interval for spinning the coating is determined by the physical properties of the respective substrate, including viscosity and surface tension in order to obtain correct film and ramp formation.

At the completion of the first spin, the support now having a ramped substrate coating, is removed from the chamber and dipped into the substrate a second time. The support is reinserted into the dust free chamber and oriented such that the thin edge of the ramped substrate is facing the outer diameter of the centrifuge which is opposite to the orientation in the first spin. The substrate coated support is then subjected to a second spin under the same conditions of centripetal acceleration and time as the first spin. At the completion of the second spin a coated support is produced in which the thickness of the substrate coating its planar surface is uniform.

According to another aspect of the invention, there is provided a method for preparing a substrate coated support for use in a micro-array platforms comprising the steps of:

(a) preparing a substrate coated support by coating at least one surface of a support with a substrate said substrate coated support having a first edge and a second edge;

(b) positioning the substrate coated support into a dust free chamber having an inner diameter and an outer diameter such that the first edge of the substrate coated support is in proximity to the inner diameter of the dust free chamber and the outer edge of the substrate coated support is in proximity to the outer diameter of the chamber;

(c) centrifuging the chamber with the inner diameter closer to the axis of rotation than the outer diameter and at a relative centripetal force and for a length of time until the substrate coating on the substrate coated support is thinner at the inner first edge than the second outer edge;

(d) removing the substrate coated support from the dust free chamber and preparing a double coated support by applying a second coat of substrate to the substrate coated support where the double coated support comprises a first and a second edge that correspond to the first and second edge of the substrate coated support;

(e) positioning the double coated support into a dust free chamber having an inner diameter and an outer diameter such that the first edge of the double coated support is in proximity to the outer diameter of the dust free chamber and the outer edge of the double coated support is in proximity to the inner diameter of the chamber;

(f) centrifuging the chamber with the inner diameter closer to the axis of rotation than the outer diameter and at a relative centripetal force and for a length of time until the substrate forms a coating in which the thickness of said coating its planar surface is uniform.

This invention will more particularly be understood by reference to the preferred embodiments in the general specification, and the contained general description, when read in conjunction with the accompanying illustrations.

BRIEF DESCRIPTION OF THE DRAWINGS

In drawings which illustrate by way of example only a preferred embodiment of the invention.

DETAILED DESCRIPTION OF THE INVENTION

Figure 1:
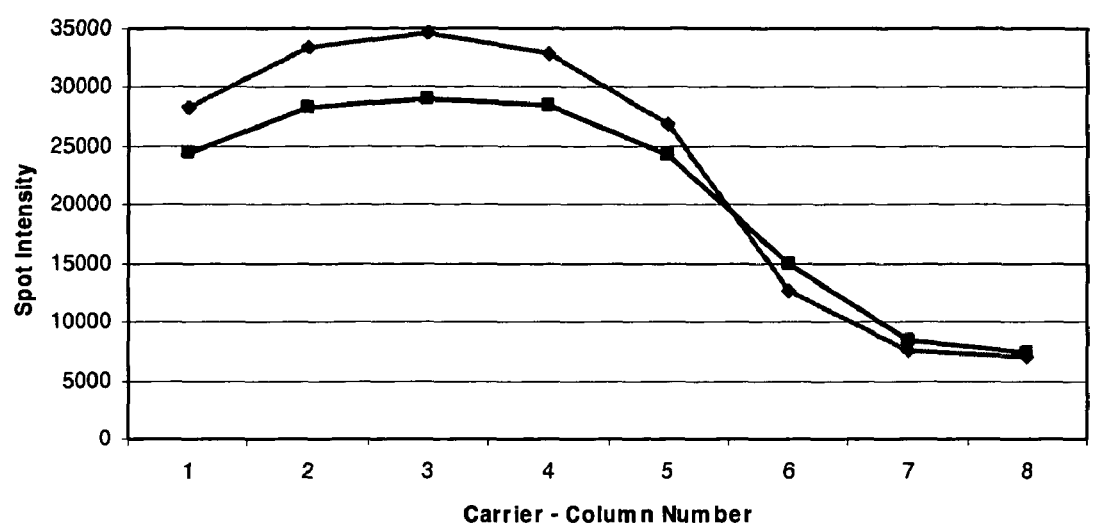
FIG. 1 is a graph illustrating the variation of coating thickness across the surface of the support after the first spin. Coating thickness is measured as a function of intensity by measuring the intensity of a series of spot measurements across the coating on the support.

High binding capacity, planar coating uniformity and surface density of binding sites are required for high signal intensity distribution. The signal intensity is further highly dependent on the interplay between the surface chemistry of the substrate, the substrate thickness as well as the planarity of the substrate coating and the uniform unit area density of binding sites in the substrate.

When coating a substrate onto a support by vertical dipping of the support into the coating substrate solution, the coating adheres to the support and excess non-adhered coating material drains from the surfaces. This results in a gravity imposed, non-planar coating on the support. The non-planarity of the coating is enhanced by the viscosity and surface tension of the coating material as modulated by adhesive and cohesive forces. Surprisingly, although even with the substrate coating in a semi-solid state, irregularities in the coating are smoothed by controlled application of centrifugal action. However, the g force that is applied during centrifugation also causes the support to have a thicker coating along the edges of the support furthest away from the spin axis of the centrifuge and a thinner coating along the edges of the support closer to the spin axis of the centrifuge ("ramping effect"). This ramping effect results in a coating on the surfaces of the support having a thickness that is significantly uneven. An uneven substrate thickness is unsuitable for use in a micro array because signal intensity is also proportional to the thickness of the substrate; therefore, signal intensity would vary across the surface of the array.

The centripetal forces work against the adhesive force between the substrate and support and cohesive forces which determine the surface tension and viscosity of the substrate to be coated onto a support. Therefore it is important to integrate these forces in such a manner that the substrate flows uniformly across the surface of the support to form a film that is contiguous with the entire surface of the support. Should, for example, the centripetal forces exceed adhesive forces, the substrate will not be retained on the support surface. This phenomenon, where the substrate flies off the spinning support during centrifugation, is known as "skittering". When skittering is prevented, the adhesive forces are sufficient to retain the substrate on the support surface. Simultaneously, a ramping effect occurs in which the cohesive forces are overcome during centrifugation resulting in a coating that is thicker at the substrate edge furthest from the axis of rotation of the centrifuge. The ramping effect is demonstrated in FIG. 1 where signal intensity was measured along the surface of a coated support after it had been dipped in the substrate once and then subjected to a single centrifugation. The coating thickness is proportional to the intensity of the signal and was, therefore, estimated based on the intensity of a series of spot measurements across the coating on the support.

Referring to FIG. 1, column 8 is a measurement of signal intensity at the edge of the support nearer to the axis of rotation which is the inner diameter of the centrifuge (ID). The substrate coating is thinner at this edge of the support. The ramping effect is evident as measurements are taken and the intensity of the signal increases moving progressively closer to support edge furthest from the axis of the centrifuge which is the outer diameter of the centrifuge (OD) (FIG. 1 columns 7 through 1).

The present invention is advantageous in that by adding a second layer of substrate and forming a second counter elevating ramp effect, the resulting substrate film is effectively uniform in thickness and therefore provides for coatings on the surfaces of the micro-array supports to become planar and have uniform substrate coating thickness.

The method according to the preferred embodiment of the present invention utilizes a first step in which a single coat of a substrate is applied to a support having planar surfaces by dipping, under controlled conditions, the support in a vertical position and with its planar surfaces exposed, into the substrate. The dip-coated support is then placed into a dust free chamber and subjected to a first spin by a centrifugal rotating means for rotating the chamber and substrate support. The chamber is rotated about its own axis in a vertical or horizontal position. The chamber is spun at sufficient speed such that the relative centripetal force applied to the support cause the substrate coating layer to form a ramped coating layer with increasing thickness in the direction from the inner to the outer diameter of the centrifuge during rotation of the substrate. Initial spin speeds in excess of 1500 rpm may be used. The upper spin speed is limited by the ability of the support to withstand the requisite, applied centripetal forces.

In the second step according to the preferred embodiment of the present invention, the substrate coated support is dip-coated for a second time in a manner similar to the first dip-coating. The support, having two coatings, is then subjected to a second spin under similar conditions to the first spin. However, in the second spin, the support is orientated such that the edge of the support closest to the ID in the first spin is placed closest to the OD in the second spin. Conversely, the edge of the support that was closest to the OD in the first spin is closest to the ID in the second spin. This relocation effectively places the area of coating having higher thickness that resulted from the first spin closer to the axis of rotation for the second spin. Surprisingly, when the planarity of the substrate coating on the support is measured, the thickness of the coating is uniform and it is planar over the entire surface the support. After the second step of the method of the present invention, the substrate coating thickness is even and, therefore, very suitable to support micro-array applications since it provides a consistent background to support signal intensity measurement as well as maintaining consistent elevation for micro-array elements above the surface of the support in providing a planar surface equidistant from the support surface.

Figure 2:
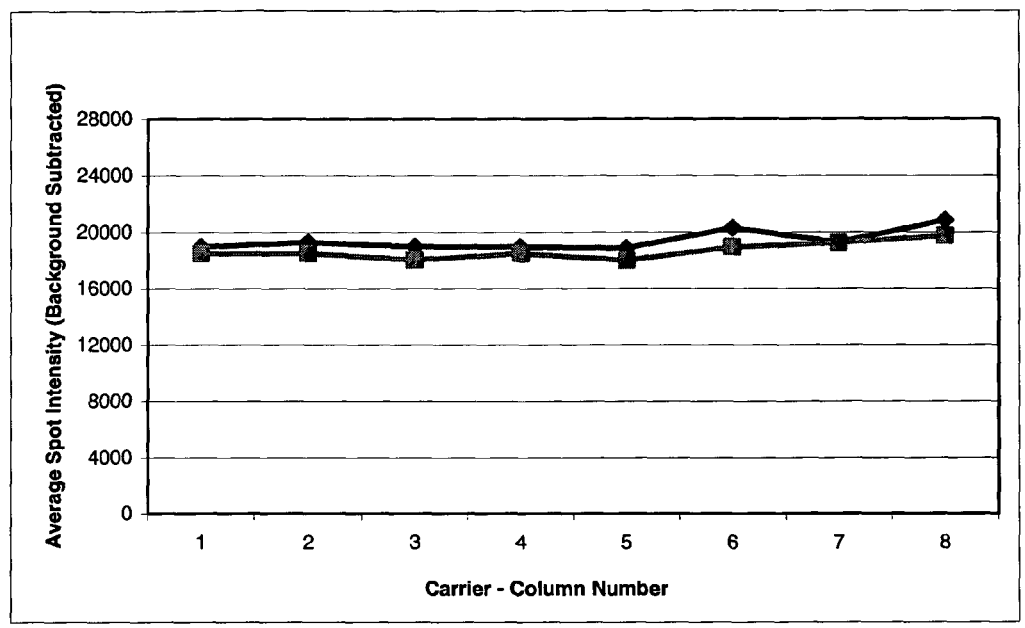
FIG. 2 is a graph illustrating the even distribution of the substrate coating across the surface of the support after the second spin. Coating thickness is measured as a function of intensity by measuring the intensity of a series of spot measurements across the now planar coating on the carrier.

FIG. 2 illustrates the same analysis conducted as described for FIG. 1. However, in FIG. 2, the analysis was conducted on a support coated with substrate using the method of the present invention. The intensity of the signal obtained from measurements taken at the edge of the support nearer to the axis of rotation (column 1) when reading closer to the edge furthest from the axis of the centrifuge (column 2 through column 8) were all similar. Although it is expected, as illustrated and confirmed in FIG. 2, that the variance in signal response at different locations on the surface of the support will be very low, surface responses measuring up to 25% variance and coating planarity measures of up to 25% variance would be acceptable, within the scope of the present invention.

Substrates prepared according to the present invention have a planar surface finish with uniform thickness of the coated material and are suitable for the purposes intended. For example, in micro-array analytical analysis platforms, the substrate should be as smooth as possible to ensure that the coating it forms on the surface of the support is as smooth and even as possible. Substrates commonly used in the art that may be used include nitro cellulose, neutral hydrophilic polymers, silanized surfaces, polyethylene glycol, amphiphilic surfactants, alkane thiols, self-assembled monolayers, streptavidin-biotin, functionalized lipids, branched polymers, gel surfaces e.g. polyacrylamide, and combinations thereof. Epoxysilane is a preferred substrate because of its environmentally compatible chemistry, its workable viscosity and its surface tension at room temperature.

Materials commonly used as support for micro-arrays that may be used for the present invention include glass, silicon, silica, plastic polymers such as polystyrene as well as metal films. Additionally, less commonly used materials that are also compatible with the present invention include various metals such as titanium, as well as glass materials and ceramic materials, and combinations of these may be utilized. The surfaces of the support may also be derivatized to have suitable covalent bonds expressed on the active surfaces that will allow cross-linking with the substrate. Examples of derivatization surface treatments include epoxy silanization and mercapto silanization with maleimido-succinimidyl cross linker and thiol reactive maleimids. In the case of expoxysilane, derivatization allows covalent links to be formed between the silanes and the support, for detection sensitivity.

Surprisingly, this coating technique allows accurate control of the ramp planarity as shown in Example 2. The centripetal force applied determines substrate thickness and ramp control. Support coating according to the present invention has been carried out at centripetal force in excess of 200 g. Thus, single speed coating is available although multi-speed coating techniques may also be utilizable. The basic advantage of this invention over the prior art is that thin coatings using substrates of relatively high solids content and high viscosity can be applied to supports by adjusting the centrifugation speed. In particular, higher rpm may be used if centrifugation is carried out in the vertical or horizontal spin coating station. The second substrate coating of the support followed by inversion of the support before applying the second spin cycle produces substrate coating surfaces that are consistently planar coatings and have uniform unit volume distribution of binding sites across the coated support surface.

The range of coating modification speeds is between the g forces applied for coating modulation to occur by centrifugal action without damaging the actual support. This is a function of the viscosity of the coating material and linkage of the coating to the surface of the support. Such parameters are easily determined by one skilled in the art. Further, one may also wish to modify the applied coating at a slower speed, and then "spin off" or dry the substrate coating at a higher speed. Initial coating speeds of 2500 rpm may also be used, subject to the construction materials and design parameters of the support.

Ramp control is achieved while using coating substrates. Coatings of comparably consistent thickness and bonding ability are achievable, and thinner or thicker coatings may be made when using the double dip/double spin method of the present invention.

Example 1

The uniformity of the epoxy coating was characterized using the following method.

Following immersion in cleaning solution, the support was centrifuged once, and then a second time in the opposite orientation i.e. the clean support was rotated 180 degrees. The support was then immersed into a cleaning solution for a second time. The support was also centrifuged a third time, and a fourth time in the opposite orientation. The clean, dry support was then coated with appropriate substrate.

A fluorescent-labeled protein solution was placed over the entire epoxy surface.

After an appropriate incubation period, excess substrate coated onto the support was washed off and the substrate coated support was dried. The substrate coated support was then scanned in a fluorescence reader to measure and map the fluorescence intensity over the entire surface. Using computer software, the support surface was divided into a rectangular grid containing equal sized circles that were touching so that the centre-to-centre distance between the circumscribed area spots was equivalent to a typical pitch, of about 300 microns, for micro-array spot diameters. The average fluorescence intensity of each spot was determined and plotted to compare the amount of fluorescent-labeled protein bound over the entire substrate of the now planar substrate on the support.

Example 2

A clean substrate coated support as known in the art is spun in a dust free holding chamber on a motorized spindle. The spindle is preferably capable of speeds over 1000 rpm (100 g). Using conventional glass supports, the support is coated on both sides with an epoxysilane because of its environmentally compatible chemistry, a workable viscosity and surface tension at room temperature. The substrate coated support is spun at a speed required to yield the desired even coating thickness, as substantiated by a plot shown for example in FIG. 2. The comparative spot density plots, confirm the substrate coating planarity, essentially a linearly changing thickness measure, indicating mitigation of what is known as the ramp effect, i.e. thinner coating at ID thicker coating at OD. This ramp effect is controlled by the degree to which material is brought to the surface of the disk. Surprisingly, centrifugal force applied to the double dip/double spin method however will result in planar coating.

Batch to batch production uniformity of coated substrate supports the use of this process, including applications in clinical diagnostics. Ninety-five percent of the CVs (co-efficient of variation) for standard proteins printed on the substrate were measured at less than 10%, and 90% of CVs measured for antigen/protein complexes printed on these substrates were also measured to be less than 10% for all batches of print runs, including epoxysilane substrate coated supports for multiplex micro-array assay platforms. Furthermore, assay reproducibility was found to be better than standard ELIZAs. For printed IgG calibration standard arrays (N=110 triplicates) over 90% of CVs were less than 10%. For printed antigens (N=280 triplicates), 90% of the IgG response CVs were less than 10%, as were IgM response CVs. Assay sensitivity was measured to be in femtoMol/ml. Signal to background ratio was very good, as was spot quality with high signal intensity. The process was optimal when double-dip/double-spin coating with 2.5% epoxysilane and was demonstrated to be better than commercially available epoxysilane on glass slide carriers. While this invention has been broadly described, other variations are determinable to those skilled in the art.

Various embodiments of the present invention having been thus described in detail by way of example, it will be apparent to those skilled in the art that variations and modifications may be made without departing from the invention. The invention includes all such variations and modifications as fall within the scope of the appended claims.

What is claimed is:

1. A method for preparing a substrate coated micro-array support for use in a micro-array comprising the steps of:
   (a) providing a micro-array support having a first edge and a second edge;
   (b) coating at least one surface of said micro-array support with a substrate;
   (c) providing a dust free chamber having an inner diameter and an outer diameter;
   (d) positioning said support into the dust free chamber such that the first edge of the micro-array support is in proximity to the inner diameter of the dust free chamber and the second edge of the micro-array support is in proximity to the outer diameter of the chamber;
   (e) centrifuging the chamber at a relative centrifugal force and for a length of time until the substrate coating on the substrate coated micro-array support is thinner at the first edge than the second edge wherein the inner diameter is closer to an axis of rotation about the chamber than the outer diameter;
   (f) removing the micro-array support from the dust free chamber;
   (g) coating the at least one surface of said micro-array support with a second coat of substrate;
   (h) positioning said micro-array support into the dust free chamber such that the second edge of the micro-array support is in proximity to the inner diameter of the dust free chamber and the first edge of the micro-array support is in proximity to the outer diameter of the chamber;
   (i) centrifuging the chamber at a relative centrifugal force and for a length of time until the substrate coating on the substrate coated micro-array support is uniform; and
   (j) removing the micro-array support from the dust free chamber, thereby providing a double coated micro-array support having a planar film with uniform thickness across the at least one surface of the micro-array support.

2. The method of claim 1, wherein step (e) comprises providing a rotating means for rotating the micro-array support in a vertical position while exposing the surface areas to be coated on both sides of the micro-array support.

3. The method of claim 1, wherein step (e) comprises providing a rotating means for rotating the micro-array support in a horizontal position while exposing the surface areas to be coated on both sides of the micro-array support.

4. The method of claim 1, wherein the micro-array support is centrifuged at 200 relative centrifugal force.

5. The method of claim 1, wherein the micro-array support is centrifuged at relative centrifugal force in excess of 200.

6. The method of claim 1 wherein the substrate includes silanized surfaces.

7. The method of claim 1 wherein the substrate includes epoxysilane.

8. The method of claim 1 wherein the surface of the micro-array support is derivatized with a derivatization surface treatment expressing covalent bonds on the at least one surface for cross-linking with the substrate.

9. The method of claim 1 wherein the coating planarity measures less than 25% variance.

10. The method of claim 1 wherein the variance for surface responses measure less than 25%.

11. The method of claim 1 wherein the at least one surface of the micro-array support is coated by dipping in liquid or semi-solid substrate.

12. The method of claim 1 wherein the at least one surface of the micro-array support is coated by dripping liquid or semi-solid substrate onto its surface.

13. The method of claim 1 wherein the substrate is rotated at a velocity between that velocity where substrate distribution occurs and a velocity where skittering occurs.

14. The method of claim 1, wherein step (i) comprises providing a rotating means for rotating the micro-array support in a vertical position while exposing the surface areas to be coated on both sides of the micro-array support.

15. The method of claim 1, wherein step (i) comprises providing a rotating means for rotating the micro-array support in a horizontal position while exposing the surface areas to be coated on both sides of the micro-array support.

16. The method of claim 8, wherein the derivatization surface treatment comprises epoxy silanization.

17. The method of claim 8, wherein the derivatization surface treatment comprises mercapto silanization with maleimido-succinimidyl cross linker and thiol reactive maleimids.

* * * * *

UNITED STATES PATENT AND TRADEMARK OFFICE
CERTIFICATE OF CORRECTION

| | | |
|---|---|---|
| PATENT NO. | : 8,080,279 B2 | |
| APPLICATION NO. | : 11/999276 | |
| DATED | : December 20, 2011 | |
| INVENTOR(S) | : Peter Lea et al. | |

It is certified that error appears in the above-identified patent and that said Letters Patent is hereby corrected as shown below:

On the title page:
In ITEM (75) Inventors:
Page 1, 1st Column, line 6    change "Bolton" to --Scarborough--

Signed and Sealed this
Twentieth Day of November, 2012

David J. Kappos
*Director of the United States Patent and Trademark Office*